United States Patent Office 3,846,164
Patented Nov. 5, 1974

3,846,164
METHODS OF MANUFACTURING POLYESTER RESINS IMPREGNATED FIBROUS COMPOSITIONS
Michel Lagache, Claude Ranson, and Nicole Tillon, Billancourt, France, assignors to Regie Nationale des Usines Renault, and Rhone Progil, both of Paris, France
Filed Apr. 20, 1972, Ser. No. 245,825
Claims priority, application France, Apr. 30, 1971, 7115551
Int. Cl. B32b 17/04; C08f 21/00
U.S. Cl. 117—126 GB
8 Claims

ABSTRACT OF THE DISCLOSURE

This method of manufacturing fibrous compositions impregnated with polyester resins consists in preparing an impregnation composition comprising a mixture of 100 parts by weight of polyester resin, 0.5 to 2% of a polymerization initiator, 0.5 to 4% of one or a plurality of alkaline-earth metal oxides, 1 to 10% of mineral or inorganic compounds comprising in their chemical structure crystallization water molecules adapted to be released in the composition under the influence of heat, using 90 to 30% by weight of this composition for impregnating 10 to 70% by weight of reinforcing fibres, and heating the impregnated product thus obtained at a temperature within the range of 50 to 100° C. during 2 to 20 minutes.

---

Figure 1:
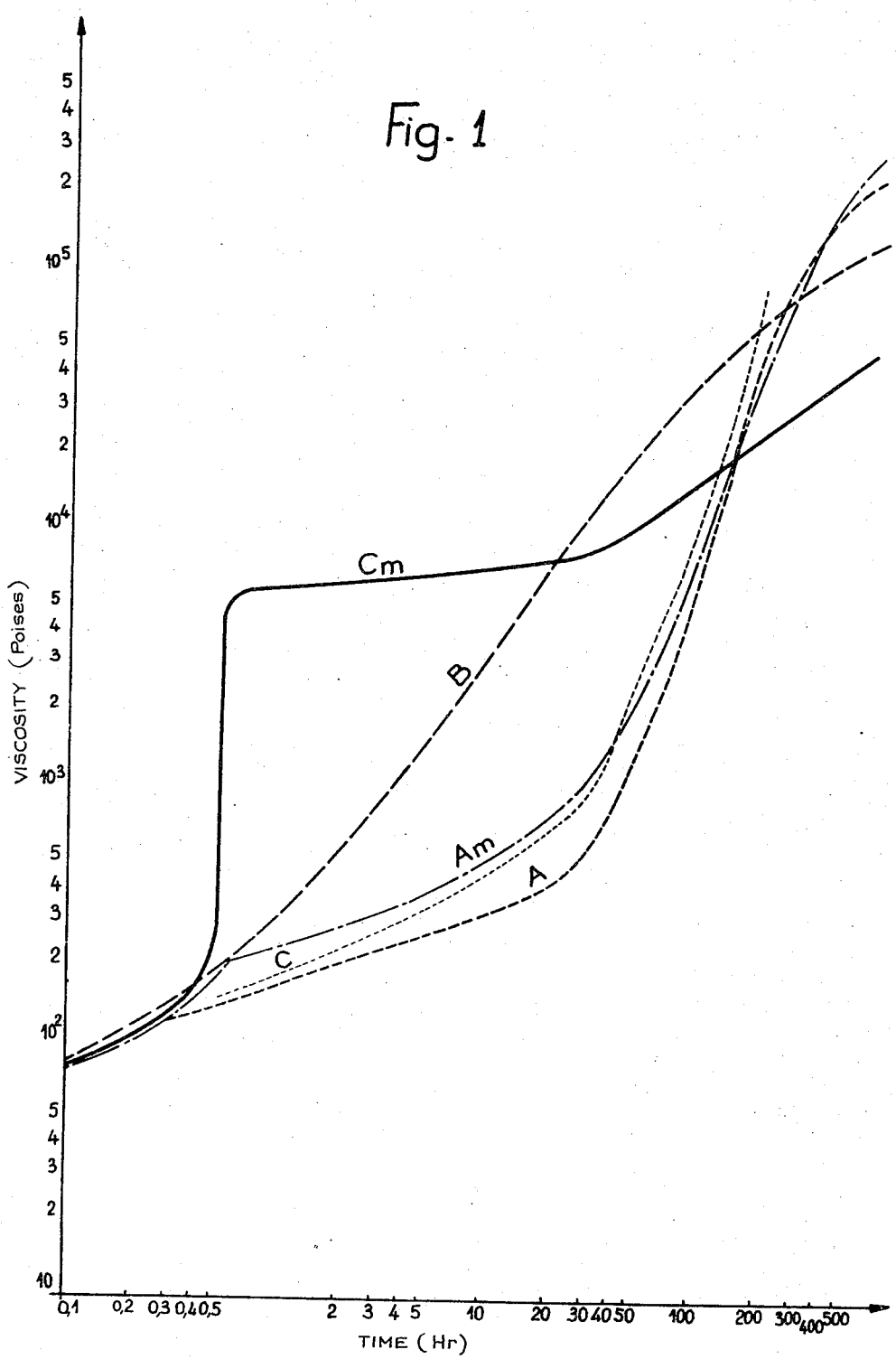

The present invention relates to a method of manufacturing fibrous compositions and has specific reference to a method of preparing such compositions impregnated with polyester resins, and also to the compositions thus obtained and the articles moulded therefrom.

It is known to manufacture fibrous compositions adapted to be stored or preserved, which are impregnated with synthetic resins and adapted to be set or hardened through the combined action of heat and pressure. More particularly, compositions consisting of cut glass fibers impregnated with unsaturated polyester resins in admixture with unsaturated monomers, such as styrene, are already known.

It is also known to impart to these fibrous compositions, usually referred to as pre-impregnated compositions, a non-tacky consistency permitting an easy and convenient handling thereof, before moulding, by injecting into these polyester resins one or more oxides or hydroxides of alkaline earth metals, such as calcium and magnesium.

The addition of these substances is attended by a gradual increment in the resin viscosity and simultaneously by a reduction in its tacky character.

However, the time necessary for obtaining the desired consistency of the pre-impregnated material, so that this material can remain homogeneous and easy to handle and mould, is relatively long, at least one week or so, thus precluding any continuous production.

In the case of a material manufactured in sheet or web form, this lack of consistency of the freshly prepared product is conducive to serious difficulties for packing the impregnated product and to detrimental distortion of the sheet or web product during the storage thereof.

On the other hand, this increment in the viscosity of the product continues indefinitely, so that after a certain dwell time at room temperature the pre-impregnated material becomes hard and dry, and losses its capacity to flow into a mould when exposed to the conjugate action of heat and pressure.

In order to reduce the time during which the product must be stored until its mouldability becomes adequate, it was proposed to add to the composition, mainly when metal oxides are used, a certain amount of water permitting the formation of a hydroxide within the product to be moulded.

In many instances this is attended by a rapid increment in the viscosity at room temperature which makes it more difficult to properly impregnate the reinforcing fibres. Yet, the desired viscosity required for obtaining satisfactory moulding properties is attained only after a minimum storage time of one day, which is still too long to afford a commercial continuous production.

Finally, this viscosity increment continues indefinitely, and therefore the preservation time of the material is rather limited.

Now the Applicants eventually discovered that these various inconveniences could be avoided by incorporating in the composition certain substances capable of causing an increment in the desired viscosity at the desired moment within a very short time period and avoiding any subsequent change in the consistency of the material. Thus, the product can be preserved at room temperature, before the moulding operation proper, during a considerably longer time period, compared with known compositions used heretofore, and on the other hand this product can be manufactured continuously under commercial conditions.

It is the chief object of the present invention to provide a method of manufacturing fibrous compositions impregnated with synthetic resins which comprises the steps of:

(a) preparing an impregnation composition consisting of a mixture containing, by weight, 100 parts of polyester resins, 0.5 to 2% of a polymerization initiator, 0.5 to 4% of one or a plurality of alkaline earth metal oxides, 1 to 10% of mineral or inorganic compounds comprising in their chemical structure crystallization water molecules adapted to be released in the composition as a consequence of the application of heat, (b) impregnating with 90 to 30% by weight of this composition 10 to 70% by weight of reinforcing fibres, and (c) heating the resulting impregnated product at a temperature of 50 to 100° C. during 2 to 20 minutes.

In addition to the essential component elements, the impregnation composition may contain lubricants, stabilizers, fillers, pigments, dyestuffs and other known additives.

The reinforcing fibres implemented comprise essentially glass fibres, in the form of strands, yarns, mats or fabrics. However, the method is also applicable to any other types of existing natural or synthetic fibres.

The polyester resin used in this process may be prepared in the known fashion from a solution in one or a plurality of monomers of a polycondensate of one or a plurality of polyols with one or a plurality of saturated or unsaturated polycarboxylic acids or anhydrides.

This resin may also include in its composition thermoplastic component elements of known type adapted to reduce the moulding shrinkage and improve the appearance of the moulded articles.

The polymerization initiators consist of conventional organic peroxides or hydroperoxides such as benzoyl peroxide, dicumyl peroxide, tertiary butyl perbenzoate, tertiary butyl hydroperoxide, cumene hydroperoxide.

The mineral oxides implemented are for example magnesia MgO and lime CaO.

The inorganic mineral compounds adapted to release water within the impregnation composition may be selected from the non-limiting list given in the following Table I.

It is recommended to introduce into the impregnation mixture a proportion of these compounds, such that the number of mols of water releasable by thermal decomposition shall range from one-half to twice the number of mols of mineral oxide contained in the mixture.

The impregnation composition may contain from 0 to 200 parts by weight of fillers, lubricants, stabilizers, pigments, dyestuffs and other known additives. The fillers suitable for this process are those generally implemented for preparing pre-impregnated materials such as calcium carbonate, clays, dolomites, etc. ... As a rule, they are used in proportions ranging from 0 to 200 parts by weights for 100 parts of impregnation mixture.

TABLE I

| Compound | Chemical formula | Decomposition temperature (° C.) |
|---|---|---|
| Double sodium and potassium tartrate. | $C_4H_4O_6KNa, 4H_2O$ | 70–80 |
| Magnesium acetate | $(CH_2CO_2)_2Mg, 4H_2O$ | 80 |
| Sodium acetate | $CH_3CO_2Na, 3H_2O$ | 58 |
| Lithium acetate | $CH_3CO_2Li, 2H_2O$ | 70 |
| Lead acetate | $(CH_3CO_2)_2Pb, 3H_2O$ | 75 |
| Barium acetate | $(CH_3CO_2)_2Ba, H_2O$ | 41 |
| Octahydrate barium hydroxide. | $Ba(OH)_2, 8H_2O$ | 78 |
| Calcium nitrate | $(NO_3)_2Ca, 4H_2O$ | 51 |
| Borax | $B_4O_7Na_2, 10H_2O$ | 60 |
| Sodium metaborate | $BO_2Na, 4H_2O$ | 57 |
| Strontium chloride | $Cl_2Sr, 4H_2O$ | 61 |
| Double sodium and calcium sulphate. | $SO_4Ca, SO_4Na_2, 2H_2O$ | 80 |
| Pentahydrate d-raffinose | $C_{18}H_{32}O_{16}, 5H_2O$ | 80 |

The mixture of the various component elements of the impregnation composition is characterised by a slow and moderate viscosity increment at room temperature. Under these conditions, it is very easy to impregnate the reinforcing fibres therewith.

The viscosity increment is subordinate to the specific nature of the polyester resin employed, to the proportion of metal oxide and also to the heating temperature. This temperature should always be lower than the temperature corresponding to the threshold of decomposition of the peroxide used in the process. The heat may be produced in any known manner, for example by using a hot air oven, heating plates or elements, infra-red radiation, high-frequency or induction heating, etc. ...

The rapid increase in the viscosity of the impregnation composition is produced by supplying heat thereto; therefore, the resulting pre-impregnated material may subsequently, previous cooling to room temperature, be stored during several months at a temperature approximating 20° C. without appreciably altering its moulding capacity according to any known techniques such as compression moulding, injection moulding or extrusion.

The pre-impregnated materials according to this invention may be obtained in the form of strips, tapes, moulding masses, bars, rods or granules.

Figure 2:
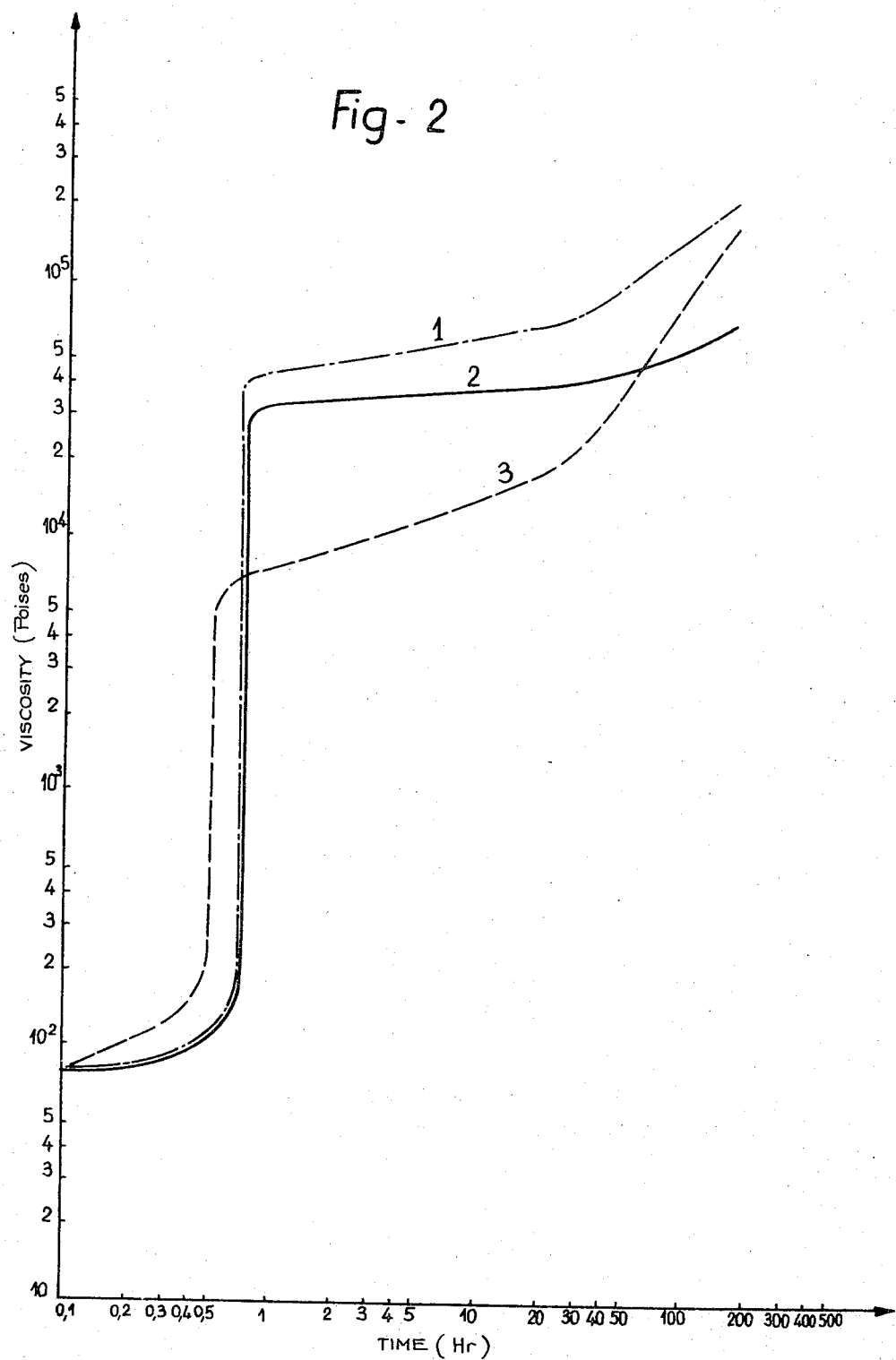

Typical examples of the manner in which the present invention may be embodied will now be described with reference to the accompanying drawing showing diagrams plotting variations in the viscosity of the polyester preimpregnated materials as a function of time, according to their mode of preparation, it being understood that these examples are given by way of illustration, not of limitation:

FIG. 1 relates to three mixtures cited in Example 1 hereinafter;

FIG. 2 relates to three additives cited in Example 2 hereinafter, and

Figure 3:
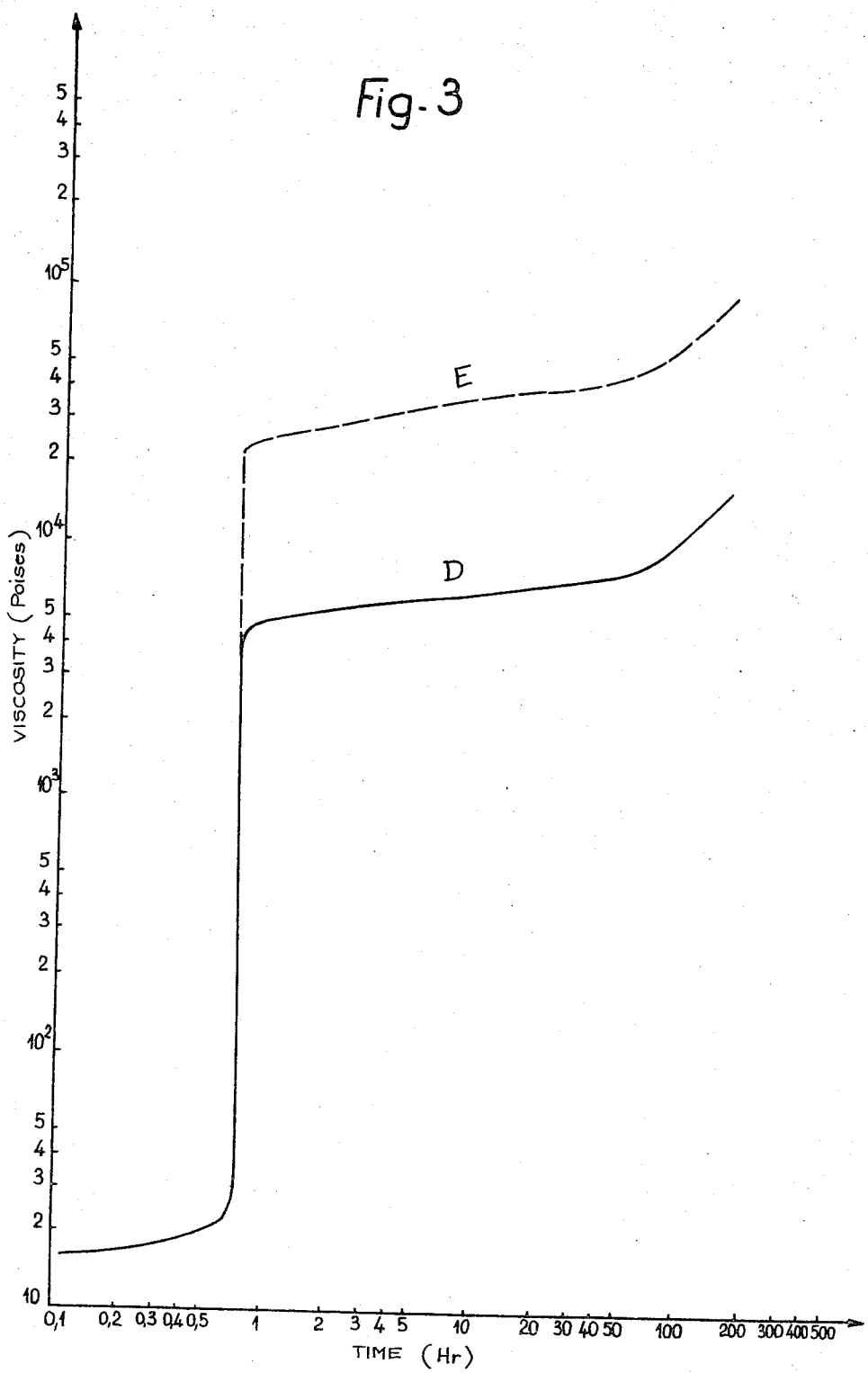

FIG. 3 relates to a standard type resin and to a low-shrinkage resin mentioned in Example 3.

Example 1

Samples of a conventional-type commercial polyester resin consisting of propylene glycol phthalofumarate dissolved in styrene are prepared, and 100 parts by weight of this resin are mixed in 100 parts by weight of commercial calcium carbonate. The resulting mixture is divided into three fractions and from these fractions the following three compositions are prepared respectively:

| | Parts by weight | | |
|---|---|---|---|
| Mixture | A | B | C |
| Ingredients: | | | |
| Polyester resin | 100 | 100 | 100 |
| Calcium carbonate | 100 | 100 | 100 |
| Dicumyl peroxide | 1.5 | 1.5 | 1.5 |
| Light calcinated magnesia | 1 | 1 | 1 |
| Water | 0 | 0.44 | 0 |
| Lead acetate $(CH_3CO_2)_2Pb, 3H_2O$ | 0 | 0 | 3.2 |

The first two mixtures are preserved at 20° C. in sealed vessels. The third mixture is heated rapidly to 70° C. and then kept during 3 minutes at this temperature. This third mixture is then cooled to 20° C. and stored like the first and second mixture.

The viscosity at 20° C. of the three mixtures, at selected time intervals, is measured by using a rotary-cylinder viscosimeter of the Rotovisko type.

Thus, the results shown in FIG. 1 are obtained. It is clearly apparent that the viscosity of mixture C, which underwent a maturation or curing operation (curve Cm), rose rapidly and then remained at a substantially constant value, while the viscosity of mixtures A and B increased gradually and continuously.

On the other hand, it will also be seen that a same mixture A but without lead acetate and cured like the mixture C, displays only a moderate viscosity increment, as shown by the curve Am.

Similarly, the mixture C, when stored at room temperature, displays a viscosity increment scarcely higher than that of mixture A containing only magnesia.

Example 2

A standard polyester resin is used for preparing three mixtures having the same composition as mixture C of Example 1; however, in these new mixtures the lead acetate was replaced respectively by:

2.3% of calcium nitrate (curve 1)
1.3% of sodium acetate (curve 2)
1.8% of magnesium acetate (curve 3).

From FIG. 2 it is clearly apparent that these three mixtures, after 3 to 18 minutes of curing at 75° C., display exactly the same viscosity trend as mixture C containing lead acetate. It is noted that the curing corresponding to the curve sections parallel to the ordinates took place in 18 minutes at 75° C. in the case of curves 1 and 2, and 3 mn. at 75° C. in the case of curve 3.

Example 3

Two mixtures denoted D and E are prepared the one from a conventional polyester resin and the other from a low-shrinkage commercial polyester resin having the following composition:

| | Mixture D (standard type) | Mixture E (low-shrinkage) |
|---|---|---|
| Ingredients: | | |
| Resin | 100 | 100 |
| Dicumyl peroxide | 1.5 | 1.5 |
| Light calcinated magnesia | 1 | 1 |
| Sodium acetate | 1.3 | 1.3 |

These two mixtures are cured during 18 mn. at 75° C. and then preserved at 20° C. in sealed vessels.

FIG. 3 illustrates the comparative evolution of their viscosities at 20° C.

It is obvious that the action exerted by sodium acetate on the viscosity of the polyester resin mixture is more pronounced with a low-shrinkage resin than with a standard type resin.

What is claimed as new is:

1. A method of manufacturing fibrous compositions impregnated with synthetic resins comprising the steps of:
   (a) impregnating from 10–70 parts by weight of reinforcing fibers with from 90–30 parts by weight of a polymerizable composition which has been prepared by
   (b) mixing in parts by weight 100 parts of a polymerizable unsaturated polyester of a carboxylic acid, 0.5 to 2 parts of an initiator for the polymerization of said polyester, 0.5 to 4 parts of one or more alkaline earth metal oxides, 1 to 10 parts of a mineral or a compound comprising in its chemical structure water of crystallization and adapted to release the water of crystallization in the composition when the composition is heated; and
   (c) heating the resulting impregnated product at a temperature of 50° to 100° C. for a period of 2–20 minutes.

2. The method of Claim 1 wherein the reinforcing fibers are predominately glass fibers in the form of strands, yarns, mats or fabrics.

3. The method of Claim 1 wherein the polyester is mixed with an ethylenically unsaturated monomer.

4. The method of Claim 1 wherein the said initiator is selected from the group consisting of benzoyl peroxide, dicumyl peroxide, tertiary butyl perbenzoate, tertiary butyl hydroperoxide and cumene hydroperoxide.

5. The method of Claim 1 wherein the alkaline earth oxide is selected from the group consisting of calcium oxide and magnesium oxide.

6. The method of Claim 1 wherein the compound capable of releasing water of crystallization is selected from the group consisting of double sodium and potassium tartrate, magnesium acetate, sodium acetate, lithium acetate, lead acetate, barium acetate, octahydrate barium hydroxide, calcium nitrate, borax, sodium metaborate, strontium chloride, double sodium and calcium sulphate and pentahydrate d-raffinose.

7. The method of Claim 1 wherein the number of mols of said water of crystallization releasable by thermal decomposition ranges from one-half to twice the number of mols of mineral oxide in the mixture.

8. The method of Claim 1 wherein the composition contains up to 200 parts by weight of fillers, lubricants, stabilizers, pigments, dyestuffs or other additives.

References Cited

UNITED STATES PATENTS

| | | | |
|---|---|---|---|
| 3,789,030 | 1/1974 | Volgstadt | 260—865 |
| 3,795,717 | 3/1974 | Vargia | 260—865 |
| 3,631,217 | 12/1971 | Rabenold | 260—865 X |
| 3,538,188 | 11/1970 | Fekete | 260—865 |
| 3,637,911 | 1/1972 | Baum et al. | 260—865 |

FOREIGN PATENTS

| | | | |
|---|---|---|---|
| 1,024,039 | 3/1966 | Great Britain | 260—865 |
| 1,017,050 | 1/1966 | Great Britain | 260—865 |

WILLIAM D. MARTIN, Primary Examiner

W. H. SCHMIDT, Assistant Examiner

U.S. Cl. X.R.

117—161 K; 260—17.4 SG, 863, 865